United States Patent
Cychosz et al.

(10) Patent No.: US 7,860,777 B2
(45) Date of Patent: Dec. 28, 2010

(54) STORED, TEMPORARY ALTERATION OF BUSINESS LOGIC

(75) Inventors: Kenneth Peter Cychosz, Apple Valley, MN (US); Brian Gilkay, Brooklyn Park, MN (US)

(73) Assignee: Residential Funding Corporation, Minneapolis, MN (US)

( * ) Notice: Subject to any disclaimer, the term of this patent is extended or adjusted under 35 U.S.C. 154(b) by 3338 days.

(21) Appl. No.: 09/952,995

(22) Filed: Sep. 14, 2001

(65) Prior Publication Data

US 2002/0116326 A1    Aug. 22, 2002

Related U.S. Application Data

(60) Provisional application No. 60/232,697, filed on Sep. 15, 2000.

(51) Int. Cl.
    *G06Q 40/00*    (2006.01)
(52) U.S. Cl. ............................. 705/37; 705/36; 705/38
(58) Field of Classification Search .................... 705/38
    See application file for complete search history.

(56) References Cited

U.S. PATENT DOCUMENTS 6,233,566 B1 *  5/2001  Levine et al. ............. 705/36 R
6,249,770 B1 *  6/2001  Erwin et al. .................. 705/10
2002/0035530 A1 * 3/2002  Ervolini et al. ................ 705/36

* cited by examiner

*Primary Examiner*—Charles R Kyle
*Assistant Examiner*—Siegfried E Chencinski
(74) *Attorney, Agent, or Firm*—Beck & Tysver PLLC

(57) ABSTRACT

A method and system are presented for making temporary changes to business logic implemented in a software program. In the preferred embodiment, business logic is stored in rules that are associated together in a series of tests. Changes to the business logic are stored in overrides, which contain one or more instructions for altering the rules. These instructions can either add or delete a business rule, or can create a new test that contains multiple business rules. The overrides themselves are grouped together into negotiations. Since the changes to the rule set are stored in overrides, no changes are made to the base rule set. Thus, updates to the base rule set are immediately effective in implementations using one or more overrides. When an evaluation is conducted in situations requiring a variation from the standard business process, the base rule set is still utilized as a starting point. The negotiations and associated overrides are then loaded and the changes found in the overrides are made to the base set. Only at this point does rules engine begin analyzing the rule set.

17 Claims, 5 Drawing Sheets

STORED, TEMPORARY ALTERATION OF BUSINESS LOGIC

CROSS-REFERENCE TO A RELATED APPLICATION

This application claims the benefit of, and incorporates by reference, U.S. Provisional Application No. 60/232,697, filed Sep. 15, 2000.

TECHNICAL FIELD

The present invention relates generally to the implementation of business logic in a computer system. More particularly, the present invention relates to the utilization of a system and method for storing and utilizing temporarily alterations to implemented business logic without altering the underlying base logic.

BACKGROUND OF THE INVENTION

It is well known that software applications can be utilized to implement computerized versions of existing business processes. Business processes are the processes a business must execute in order for the business to operate. For example, a finance company that originates or purchases mortgages or other loans must be able to analyze those loans or loan applications in order to determine if the loan meets the company's requirements. The tests and procedures that are applied to complete this analysis are examples of business processes.

Software products currently exist that allow a business manager to define business processes according to a set of business rules. These rules analyze and compare business data and make a determination based on the result of that analysis. Often, these rules are in the form of "IF X THEN Y" type statements. Another way to envision these business rules is through a flow chart, which shows the evaluation of and flow from one business rule to another.

Once the business rules are defined, they can be entered directly into the software product. This step may involve the assistance of a computer programmer, or the software product may be designed such that the business rules can be defined and entered by a business manager with no programming experience. The software product is then able to implement these rules using some type of rules engine. In order for the rules engine to be effective, the software product must also have a support layer that assists the rules engine. The support layer is able to access and alter the business data upon which the business rules act.

These types of software products have greatly assisted companies in the speedy development of new business applications. This is especially important when it is realized that companies are constantly adjusting and changing the processes they utilize to accomplish their work. Since these software products implement most of the business processes in high level business rules, it is much easier to monitor and change these rules to reflect revised business processes than to change applications that are programmed from scratch.

Unfortunately, none of these products are able to effectively handle temporary changes to the business logic. For instance, a company that purchases loans for securitization may have a standard set of business rules to analyze the loans in order to determine whether they are appropriate for purchase. Such a company may enter into negotiations with a variety of loan originators, and these negotiations may lead to a change in the business rules when evaluating loans from these originators. Thus, it would be useful to temporarily adjust the business rules to reflect the negotiations without making a permanent change to the underlying base rules. While it would be possible to simply duplicate the base rules and then make changes to the duplicate set of rules, this would require that multiple sets of rules be maintained. If, at a later date, a change is desired for the base set of rules, the change would have to be carried over to each of the duplicate set of rules made for each negotiation. What is needed is a way to maintain only one set of base rules, with a system that is capable of making temporary alterations to the base set according to negotiations made with each originator.

SUMMARY OF THE INVENTION

The present invention meets this need by implementing temporary changes in one or more sets of alterations. Each of these sets, known as overrides, contain changes to the base business rules, such as the addition or deletion of a particular rule. In the preferred embodiment, rules are associated together in a series of tests. In this preferred embodiment, the overrides are also capable of adding or deleting a test to the base rule set. Since the changes to the rule set are stored in overrides, no changes are made to the base rule set. Thus, updates to the base rule set are immediately effective in implementations using one or more overrides.

The overrides themselves are grouped together into negotiations. Thus, one negotiation may contain multiple overrides. In this way, separate negotiations can exist that contain the same overrides, without the need to duplicate the information in each override. Each client is then associated with one or more negotiations. When an evaluation is conducted for a client, the base rule set is loaded into the rules engine. The negotiations and associated overrides are also loaded, and the changes found in the overrides are made to the base set. Only at this point does the rules engine initiate the rule set.

DETAILED DESCRIPTION OF THE INVENTION

Figure 1:
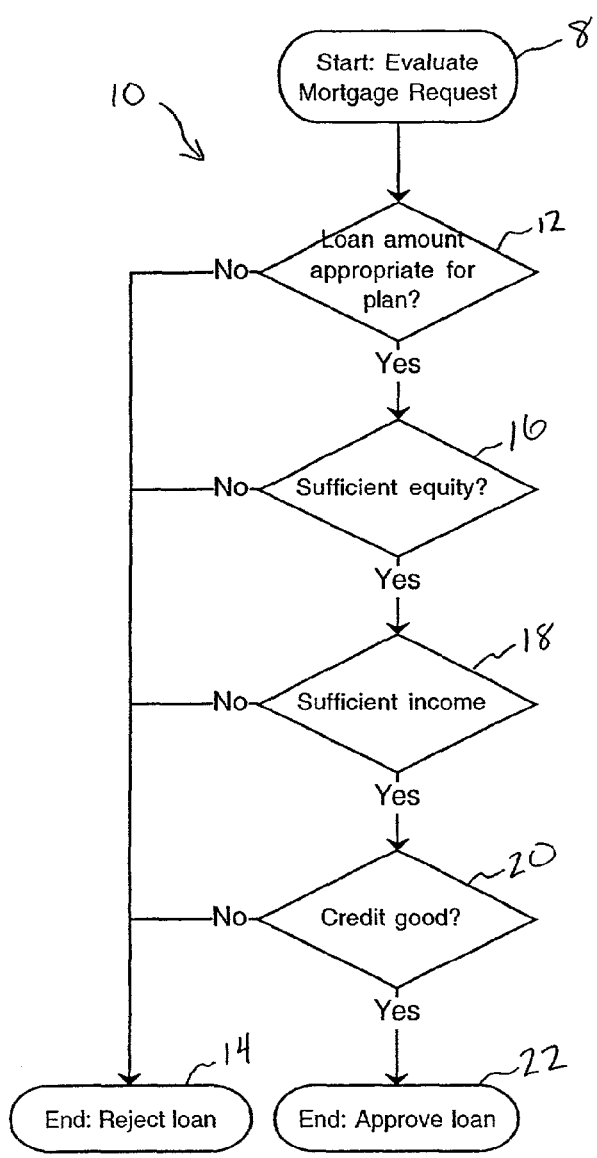
FIG. 1 is a flow chart showing simplified business logic for a loan approval process.

FIG. 1 contains a flow chart 8 showing a simplified business process 10 that determines whether a particular loan meets the requirements of a financial institution. Such a business process might be used by a loan originator to determine whether a particular applicant should be approved, or by a loan investor to determine whether a particular loan should be purchased and/or securitized. Obviously, the business process embodied in the flow chart of FIG. 1 is overly simplistic, but it is appropriate for the purpose of setting forth the present invention. In addition, although the process 10 shown in the Figures is specific to the concept of evaluating mortgages and other loans secured by real estate, this process 10 has been selected only for the purposes of explanation. The present invention would be equally useful in other types of business processes.

The type of process 10 shown in FIG. 1 would be specific to a particular class of loan as defined by a financial institution. Different classes are used to represent different risk levels, with preferred classes having a lower risk and an associated lower interest rate, and suboptimal classes having a higher risk and interest rate. Each class of loan would likely have its own business process 10, although the basic elements of each process 10 might be similar.

The business process 10 shown in FIG. 1 contains four basic steps. First, a determination must be made as to whether the loan amount is appropriate for the product being considered. This is shown as step 12 in the flow chart. If this step 12 does not find the loan amount to be appropriate, the process 12 ends at step 14, with a rejection of the loan.

If the loan amount is appropriate, then step 16 determines whether the applicant has sufficient equity in the home. If not, the process 10 ends at step 14 with a rejection. If so, step 18 is invoked to determine if the applicant has sufficient income. A no determination at this step 18 will also lead to a rejection at step 14. A yes determination leads to step 20, which will determine whether the applicant's credit history is sufficiently positive. If not, the loan is rejected. If it is, the loan is approved at step 22.

The four main steps 12, 16, 18, and 20 of process 10 are often thought of as tests. If all tests are evaluated successfully, the loan is approved. In this parlance, the business process 10 that is represented in flow chart 8 can be fully represented in the test set 30 shown in FIG. 2. The test set 30 beings with a pointer to the first test 40. This test 40 evaluates the size of the loan being evaluated. If the size is appropriate, then the test 40 is successful. A successful test will usually result in another test being performed. In this case, the next test is test 50, which evaluates the equity that the applicant will have in the subject property. If test 40 were not completed successfully, then the test set 30 would end unsuccessfully. This would indicate that the loan being evaluated is rejected.

If test 50 evaluates successfully, test 60 is then evaluation. This test 60 evaluates whether the applicant has sufficient income for the loan. If so, then test 60 is successful and test 70 evaluates the credit history of the applicant. Tests 40, 50, and 60 each point to a subsequent test that is to be evaluated upon the successful evaluation of the current test. Test 70 does not point to a subsequent test, and hence is considered a leaf element or terminal node of the test set 30. It is possible to design a test set with multiple branches, each of which could terminate in one or more leaf elements. If the traversal of one branch is unsuccessful due to the failure of a test along that branch, another branch of the tree could be traversed. The branches of a tree are all traversed until either a leaf element test has been successfully evaluated, or until all branches of the tree have been unsuccessfully attempted. If the test set 30 ends after the successful evaluation of a leaf element test, such as test 70, then the test set 30 has been successfully evaluated and the loan is approved. Since the test set 30 has only one branch, the unsuccessful evaluation of any of the tests 40, 50, 60, or 70 will result in the failure of the test set 30, and the loan would therefore be rejected.

The test set 30 contains all of the logic found in the flow chart 8 of FIG. 1. In fact, test set 30 and flow chart 8 can be considered interchangeable representations of the business logic 10. Other representations are equally plausible, and the present invention is not limited to any particular representation of the underlying business logic. Nonetheless, the utilization of test sets 30 often makes the implementation of business logic more straightforward, and hence will be used in the remainder of this discussion.

Figure 2:
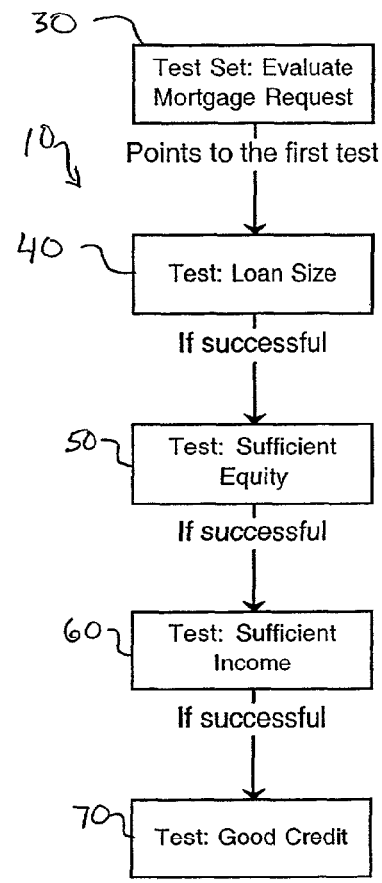
FIG. 2 is a chart showing the business logic of FIG. 1 in a test format.
Figure 3:
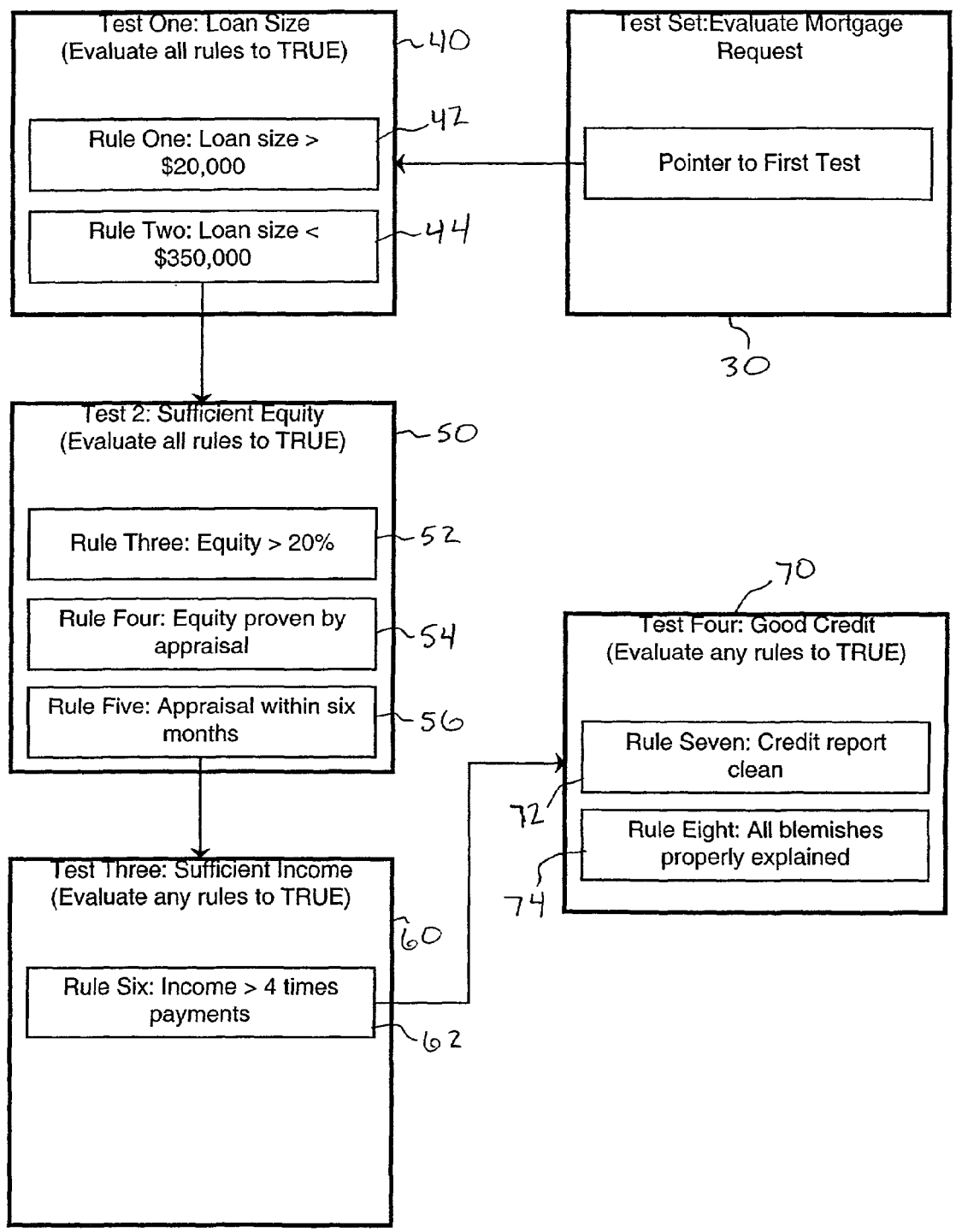
FIG. 3 is a chart showing the test format logic of FIG. 2 utilizing business rules to define each test.

The test set 30 of FIG. 2 is shown in more detail in FIG. 3. FIG. 3 divides each of the tests 40, 50, 60, and 70 into one or more rules, which are shown as rectangular boxes within each of the tests. These rules contain the actual logic that determines whether or not a particular test succeeds.

The loan size test 40 is identified as "Test One" in FIG. 3. The second text line in this rule indicates that all rules in this test are to be evaluated to TRUE. This means that this test will not be considered successfully evaluated until each of the rules in the test have been examined and found to be true. If any rule is evaluated to false, then the test is unsuccessful.

Test 40 contains two rules 42, 44. The first rule 42, identified as "Rule One," states that the loan should be greater than $20,000. The second rule 44 (Rule Two) states that the loan size should be less than $350,000. These two rules 42, 44 together ensure that the loan is between $20,000 and $350,000.

The second rule 44 is shown in FIG. 3 with an arrow leading to the second test 50. This is because rules in the preferred embodiment are capable of linking to additional tests. If a rule is evaluated to be true and is linked to another test, that test is evaluated next. While most tests will have only a single rule that points to an additional test, it is possible that multiple rules within a single test will be linked to multiple external tests. By allowing this, it is possible to create a branch in the test set 30. In the case of the first test 40, only one rule 44 (Rule Two) is linked to a test. Hence, there is no branching that takes place from this rule 42.

The second test 50 (Test Two) evaluates the equity position of the applicant, and contains three separate rules that must all be evaluated to TRUE. The first rule 52 (Rule Three) determines whether the equity exceeds twenty percent. The second and third rules 54, 56 (Rules "Four" and "Five") make sure the equity is proven by an appraisal, and that the appraisal is not more than six months old. Again, if any of these rules 52, 54, 56 are evaluated to be false, the second test 50 fails and the loan is rejected. Rule Five (56) points to the third test 60, and hence indicates that this test 60 will be evaluated when Rule Five (56) is determined to be true.

The third test 60 contains only a single rule 62 (Rule Six), which verifies that the applicant's income exceeds at least four times the expected loan payments. If this rule 62 is true, then the fourth test 70 is evaluated. This test 70, labeled "Test Four," contains two rules 72, 74. Unlike the first two tests 40, 50, only one of these rules needs to be true for this fourth test 70 to be successfully evaluated. The first rule 72 (Rule Seven) determines whether the credit report is clean. The second rule 74 (Rule Eight) determines whether any blemishes on the credit report are properly explained. Thus, this fourth test 70 is successful either on a completely clean credit report, or upon satisfactory explanations for all of blemishes found on the credit report. If this test 70 is reached and successfully evaluated, then the loan is approved.

The test set 30 of FIG. 3 represents the business logic that a company would use to evaluate whether a particular loan request meets the company's requirements for a particular loan product. As mentioned above, the company may be a mortgage investor who may use this business logic to determine whether to purchase a particular mortgage or other loan for a particular class of consolidated loans. Once this business logic is embodied in a software product, the software can be utilized to review numerous loans in an efficient and consistent manner.

Figure 4:
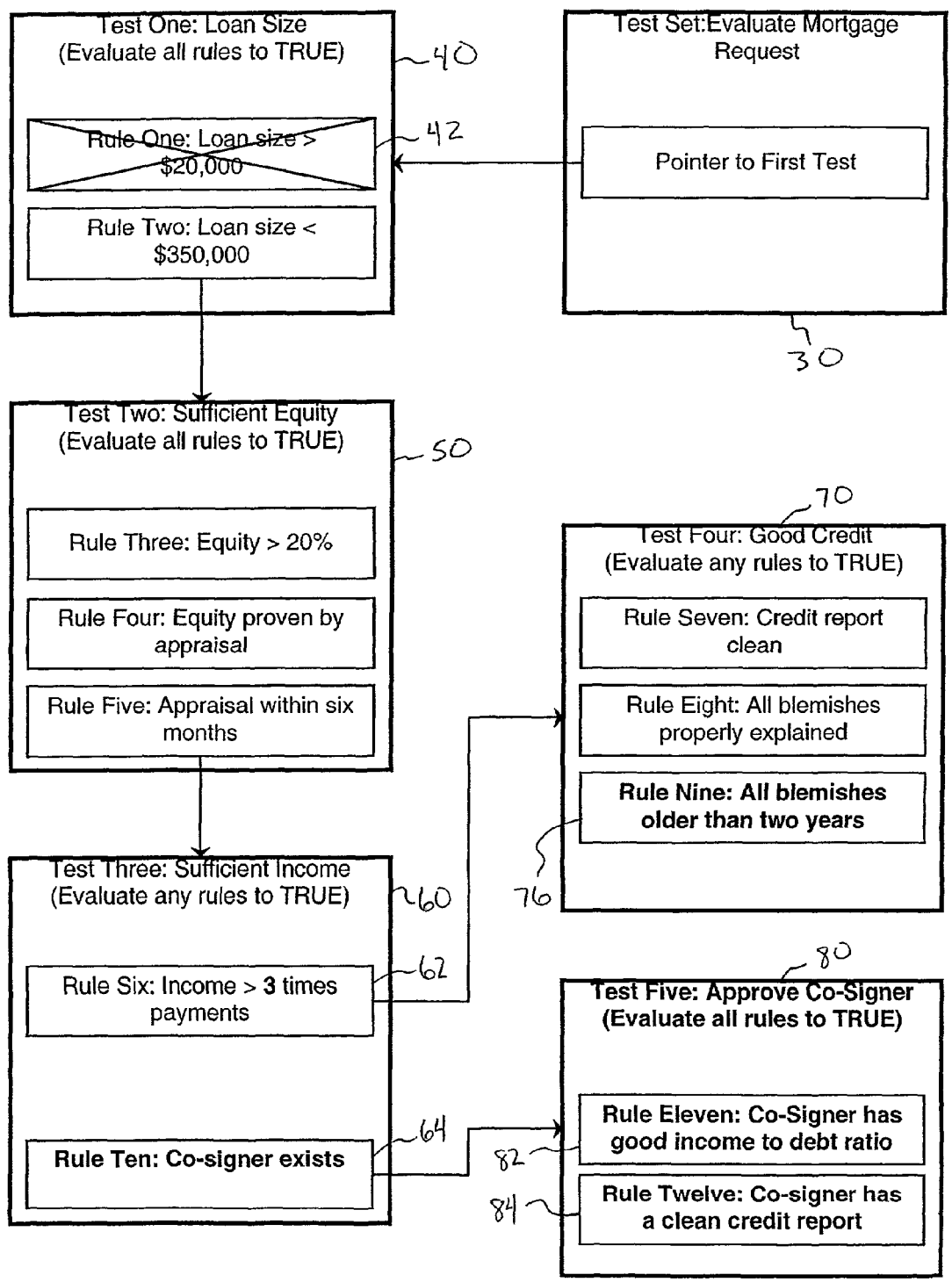
FIG. 4 is a chart showing the test and rules of FIG. 3 altered according to a negotiated change to the business logic.

Sometimes, however, an investor will negotiate with particular loan originators in order to alter the evaluation standards for loans sold by that originator. For instance, a particularly large originator with a lower than average loan default ratio would likely be able to negotiate more favorable loan purchase evaluation terms. FIG. 4 shows an example negotiation and the effect it has on the test set 30 embodying the loan purchase evaluation logic.

The first alteration is that Rule One (42) has been deleted. Thus, there is no longer a minimum loan size requirement. In addition, Rule Six (62) has been altered such that the applicant's income need only be three times the expected payments. An additional rule 76 (Rule Nine) has been added to Test Four 70. Since Test Four 70 will evaluate to true when ANY of its rules are true, Rule Nine will allow the applicant's credit to be considered good as long as all blemishes on the credit report are greater than two years old.

In addition, FIG. 4 shows an additional rule 64 (Rule Ten) has been added to Test Three 60. This Rule Ten (64) determines whether a co-signer for the loan exists. If so, a new test 80 (Test Five) is executed. Note that Test Three (60) requires that only one of its rules be evaluated to TRUE in order for the test 60 to be considered successful. Consequently, this new Rule Ten 64 means that there are now two ways that Test Three (60) can be evaluated successfully, namely if the income exceeds three times the payment, or if a co-signer exists. This creates a branch in the logic of test set 30. Since Test Three 60 is not a leaf node in either case, additional tests (namely Test Four 70 or Test Five 80) have to be evaluated before the complete test set 30 is successful. However, the branch created by Rule Six (62) and Rule Ten (64) means that only one of these branches needs to be successful.

Test Five (80) is completely new to FIG. 4, and contains two rules. The first rule 82 (Rule Eleven) asks whether the co-signer has a satisfactory income to debt ratio, while the second rule 84 (Rule Twelve) asks whether the co-signer has a clean credit report. If both of these rules are true, then Test Five 80 will be successfully evaluated.

The present invention is designed to ease the temporary alteration of business logic from one scenario to another, such as between the logic of FIG. 3 and FIG. 4. Obviously, the ability to change business logic is built into most every software program that allows the implementation of business logic. However, these other programs do not allow the temporary alteration of business logic while keeping the base logic intact.

For instance, it would be possible to simply make the changes shown in FIG. 4 to the logic of FIG. 3 as if one was altering the base logic of the business process. However, in the case of a negotiated change to the business logic, the change applies only to the party who negotiated the change. All other parties presenting loans for analysis would not be subject to these changes, and their loans should be subject to the original logic of FIG. 3. Thus, if the logic of FIG. 3 were permanently altered into that of FIG. 4, it would no longer be possible to analyze loans according to the logic of FIG. 3.

One way around this dilemma is to simply create two different test sets, one containing the logic of FIG. 3 and another containing the logic of FIG. 4. Unfortunately, the process of creating different test sets permanently separates the underlying base logic that is consistent between the two test sets. For instance, Test Two (50) is unchanged between FIG. 3 and FIG. 4. If later analysis of the business process 10 results in a change to Test Two (50), then it would be necessary to change Test Two (50) in each of the two test sets. If this result is played out over hundreds of rules and tests across numerous different test sets, the job of maintaining consistency over the test sets becomes overwhelming.

Figure 5:
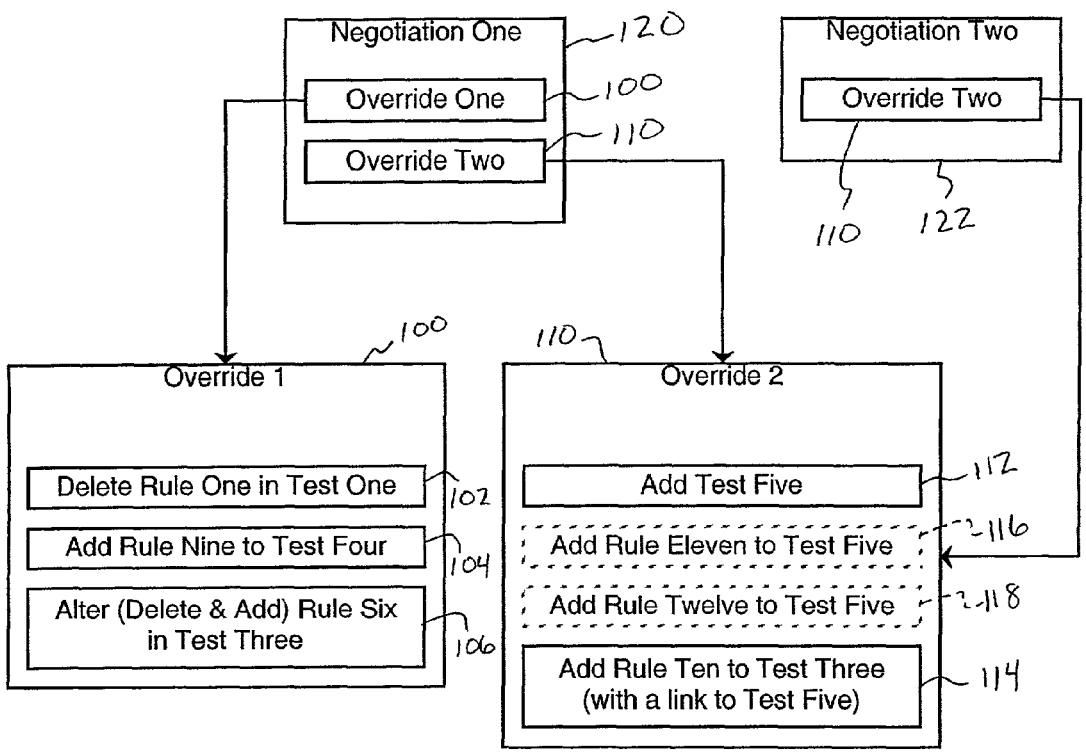
FIG. 5 is a chart showing the changes of FIG. 4 represented as negotiations and overrides.

The present invention solves this problem by leaving the base business logic unaltered when implementing a negotiated change to the logic. Rather than making a permanent change, or duplicating the entire logic, the negotiated changes are stored separate from the test set 30. FIG. 5 shows one embodiment that stores the negotiated changes separate from the business logic.

In FIG. 5, negotiated changes are stored in one or more overrides 100, 110. Each override 100, 110 contains at least one alteration to the business logic of the test set 30. For instance, Override One (100) contains three alterations 102-106. The first alteration 102 contains an instruction to delete Rule One (42) in Test One (40). The second alteration 104 contains an instruction to add Rule Nine (76) to Test Four (70). The third alteration 106 contains an instruction to alter Rule Six (62) in Test Three (60). An instruction to alter a rule is identical to instructions to first delete the rule and then add a replacement rule. Hence, alteration 106 can really be considered shorthand for two alterations, a delete rule and an add rule alteration.

Similarly, Override Two 110 contains two main alterations 112, 114. The first alteration 112 is an instruction to add Test Five (80) to the test set. The second alteration 114 adds Rule Ten (64) to Test Three (60). Included in Rule Ten (64) is the link to Test Five (80). Two additional alterations 116, 118 are shown in dashed lines in FIG. 5. These two alterations 116, 118 populate Test Five (80) with Rule Eleven (82) and Rule Twelve (84). They are shown in dashed lines to indicate that they may not be needed in implementations where Test Five is pre-stored with rules Eleven (82) and Twelve (84) already within it.

The overrides 100, 110 combine the alterations 102-106, 112-118 into logical groupings. For instance, Override Two 110 contains the alterations 112-118 to add the possibility of a co-signer to the test set 30. The overrides 100, 110 are combined into negotiations 120, 122. Negotiation One 120 contains both overrides 100, 110, while Negotiation Two 122 contains only Override Two 110. Each negotiation 120, 122 contains all of the changes that are necessary to convert the base business logic (such as in FIG. 2) into the temporarily business logic needed to actually evaluate a loan from a particular originator (such as in FIG. 3). There is no limit to the actual number of overrides 100, 110 that can coexist in a single negotiation 120, 122. Once the negotiations 120, 122 are created, they are associated with one or more customers. It is possible for a customer to be associated with more than one negotiation 120, 122.

The actual content of the alterations 102-106, 112-118 will depend on the implementation of business logic used. If the business logic uses tests and rules, such as shown in FIGS. 2-4, then the alterations 102-106, 112-118 will contain instructions on altering tests and rules. In this embodiment, there are three basic types of instructions: 1) delete a rule, 2) add a rule, and 3) add a test. As mentioned above, an instruction to alter a rule is simply a combination of a delete and an add instruction. In addition, it would be relatively straightforward to implement tests that contain sub-tests as well as rules. If this were done, the instructions to delete a rule would include the capability to delete a sub-test, and the instructions to add a rule would include the capability to add a sub-test. If it were necessary to distinguish between tests that contain rules and tests that contain sub-tests, the instructions would have to specify which type of test or sub-test is being created. Also, one might say that it is necessary to include an instruction to delete a test. However, since tests are only accessed in the preferred embodiment when a rule that links to the test is evaluated to be true, a test can be successfully eliminated from a test set simply by deleting the appropriate rule. Of course, other implementations may change this standard. The important aspect of the present invention is that the alterations 102-106, 112-118 contain instructions that are able to alter the business logic as needed, regardless of the form that the business logic takes.

The present invention allows numerous, slightly altered versions of business logic to coexist. This is accomplished by storing each of these versions in one or more overrides 100, 110 that store instructions on how to change business logic rather than contain the actual business logic. The use of these overrides allows temporary changes to be made to business logic without permanently altering the base business logic. This also allows the base business logic to be stored only once, and further allows alterations that are made to the base business logic to instantly affect all of the altered versions of the business logic.

Figure 6:
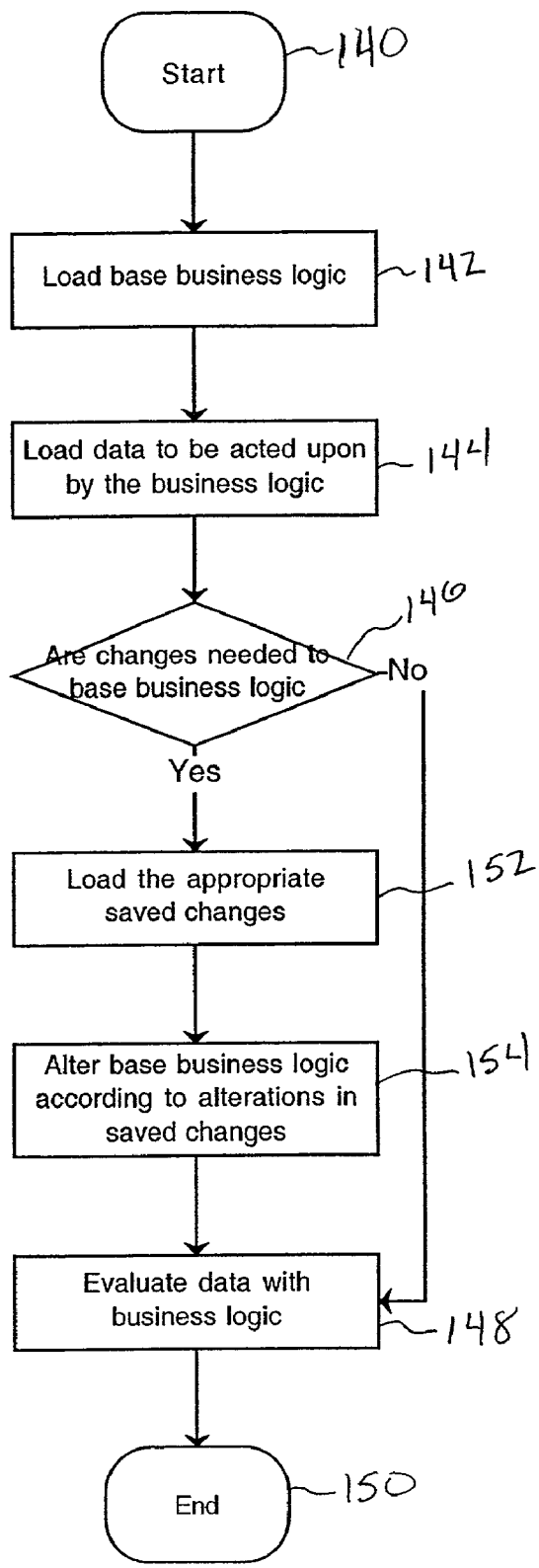
FIG. 6 is a flow chart showing the process used in the present invention.

The process 140 by which these advantages are achieved is shown in FIG. 6. The first step 142 in this process 140 is to load the base business logic. This is the business logic that is normally applied to a particular circumstance. Since the business logic must act on actual data, it is also necessary to load the appropriate business data, which takes place in step 144.

Next, it is necessary to identify whether the present circumstances require any temporary changes to the base business logic. This is generally accomplished by analyzing the data to which the business logic will be applied. In the example of analyzing mortgages or other loans for purchase by an investor, this determination is made by examining the originator of the loan being analyzed. If the originator has negotiated changes to the basic business logic with the investor, than those changes must be implemented before the business logic is applied to the data. This determination is made in step 146. If no changes are needed, step 148 analyzes the business data with the unaltered, base business logic, and the process 140 ends at step 150.

It is also possible that step 146 makes this determination based upon a formal parameter passed to the process 140 along with an identification of the base business logic to be utilized. For instance, process 140 could be initiated with a request to run the business logic for a particular, preferred financial product. Included with that request would be an identifier for the source of the loan, which would identify whether the base business logic needs to be changed. In this type of embodiment, it would not be necessary to load the data (step 144) before making the determination in step 146. Rather, the data could be loaded right before the data is evaluated in step 148.

If step 146 determines that changes should be made to the base business logic, step 152 identifies and loads the appropriate changes. In the preferred embodiment, those changes are stored in the form of instructions grouped together in overrides 100, 110, with all of the overrides 100, 110 that are to be acted upon at once being grouped together in negotiations 120, 122 associated with a particular customer. Of course, the grouping of alterations into overrides 100, 110 and negotiations 120, 122 is just one of the many ways in which alteration instructions can be saved and recalled. Many other groupings would be obvious to those of ordinary skill, and are well within the scope of the present invention.

Once the alteration instructions are loaded in step 152, it is necessary to alter the base business logic according to those instructions. This is accomplished in step 154. In the preferred embodiment, the business logic is stored in tests containing rules. As a result, the stored alteration instructions relate to the addition and deletion of tests and rules. Other implementations of business logic may involve constructs different than tests and rules. In those environments, the alteration instructions would by necessity contain instructions to alter those constructs. Once the alteration instructions are applied to the base business logic, the altered business logic is applied to the business data in step 148, and the process 140 ends at step 150.

Of course, many possible combinations of features and elements are possible within the scope of the present invention. For instance, the business logic in the above description was implemented in the context of tests containing one or more rules. It would be possible to alter the implementation of the business logic without departing from the scope of the present invention. In addition, although the invention was described in the context of mortgage loan evaluation, the concepts of the present invention are not so limited. The current invention is equally applicable in other areas where business logic needs to be temporarily altered without making permanent changes to the underlying base logic. Because many such combinations are present, the scope of the present invention is not to be limited to the above description, but rather is to be limited only by the following claims.

What is claimed is:

1. A computer system for analyzing a financial asset originated or proposed to be originated by a first party to determine whether the financial asset will be purchased by a second party, the computer system comprising:
   a) software programming having:
      i) programming for loading stored basic business logic used by the second party to analyze financial assets;
      ii) programming for storing changes to the basic business logic negotiated between the first party and the second party;
      iii) programming for loading the stored changes and applying those changes to the basic business logic to create temporary, negotiated business logic without permanently altering the stored basic business logic;
      iv) programming for loading financial asset data,
      v) programming for analyzing the financial asset data pursuant to the negotiated business logic, and
      vi) programming to indicate approval or rejection for the financial asset based on the analysis of the financial asset data pursuant to the negotiated business logic.

2. The computer system of claim 1, wherein the stored basic business logic is defined as a series of tests, with each test containing at least one rule against which the financial asset data is analyzed.

3. The computer system of claim 2, wherein each rule creates a true/false result.

4. The computer system of claim 3, wherein each test creates a true/false result.

5. The computer system of claim 4, wherein the result of each test depends upon the analysis of the rules within the test; and further wherein a first test requires all of its rules to evaluate to true to obtain a true result for the first test, and further wherein a second test requires any of its rules to evaluate to true to obtain a true result for the second test.

6. The computer system of claim 2, wherein the stored changes contain instructions to alter the tests and rules of the basic business logic.

7. The computer system of claim 6, wherein one of the instructions are chosen from a set comprising an instruction to delete a rule, an instruction to add a rule, and an instruction to add a test.

8. The computer system of claim 6, wherein all of the instructions are found in a set comprising an instruction to delete a rule, an instruction to add a rule, and an instruction to add a test.

9. The computer system of claim 6, wherein multiple instructions are grouped together into a plurality of override logical groupings.

10. The computer system of claim 9, wherein the first party is associated with a first override grouping, and a third party is associated with a second override grouping.

11. The computer system of claim 9, wherein multiple override logical groupings are themselves grouped together into a plurality of negotiation logical groupings.

12. The computer system of claim 1, further comprising programming for loading a revised business logic, and further wherein the programming for loading the stored changes and applying those changes to the basic business logic also applies the stored changes to the revised business logic.

13. A method for implementing computerized business logic comprising:
   a) storing in a computer loadable format:
      i) basic business logic,
      ii) a first stored change to the basic business logic, and
      iii) a second stored change to the basic business logic;
   b) loading the first stored change into a computer program with the basic business logic, and then, using the computer program,
      i) applying the first stored change to the basic business logic to define a first negotiated business logic,
      ii) using the first negotiated business logic to analyze data relating to a first financial asset,
      iii) using that analysis to create an indication of approval or rejection of the first financial asset; and
   c) loading the second stored change into the computer program with the basic business logic, and then, using the computer program,
      i) applying the second stored change to the basic business logic to define a second negotiated business logic,
      ii) using the second negotiated business logic to analyze data relating to a second financial asset, and
      iii) using that analysis to create an indication of approval or rejection of the second financial asset.

14. The method of claim 13, further comprising revising the basic business logic without revising the first stored change or the second stored change.

15. The method of claim 14, wherein the first negotiated business logic is redefined by applying the first stored change to the revised basic business logic and further wherein the second negotiated business logic is redefined by applying the second change to the revised basic business logic.

16. The method of claim 13, wherein a first customer is associated with the first stored change and a second customer is associated with the second stored change, wherein each customer has negotiated separate changes to the basic business logic for analyzing that customer's financial assets and further wherein these separate negotiated changes are represented in each customer's stored changes.

17. A computer system for analyzing loans offered for sale from a first and second customer to an entity, the computer system comprising:
   a) storage containing:
      i) basic computerized business logic defining a set of basic rules for analyzing a loan for approval or rejection as established by the entity,
      ii) a first computerized customer change to the basic computerized business logic defining changes negotiated by the first customer to the basic rules for analyzing a loan established by the entity, and
      iii) a second computerized customer change to the basic computerized business logic defining changes negotiated by the second customer to the basic rules for analyzing a loan established by the entity; and
   b) software programming for:
      i) loading the basic computerized business logic and the first and second computerized customer changes,
      ii) when analyzing a first customer loan from the first customer,
         (1) applying the first computerized customer changes to the basic computerized business logic to create first customer negotiated logic, and
         (2) analyzing the first customer loan to determine whether the first customer loan meets the basic rules for analyzing a loan established by the entity with the changes negotiated by the first customer, and
      iii) when analyzing a second customer loan from the second customer,
         (1) applying the second computerized customer changes to the basic computerized business logic to create second customer negotiated logic, and
         (2) analyzing the second customer loan to determine whether the second customer loan meets the basic rules for analyzing a loan established by the entity with the changes negotiated by the second customer.

* * * * *